United States Patent
Lee

(10) Patent No.: US 6,430,361 B2
(45) Date of Patent: Aug. 6, 2002

(54) MULTI-ANGLE DIGITAL AND AUDIO SYNCHRONIZATION RECORDING AND PLAYBACK APPARATUS AND METHOD

(75) Inventor: Hee-Soo Lee, Ahnsan (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/978,141

(22) Filed: Nov. 25, 1997

(30) Foreign Application Priority Data

Nov. 28, 1996 (KR) .......................................... 96-58963

(51) Int. Cl.$^7$ ................................................ H04N 5/91
(52) U.S. Cl. ...................... 386/98; 386/109; 386/124; 386/125
(58) Field of Search ............................. 386/95, 98, 99, 386/104, 96, 97, 92, 93, 125–126, 105, 124; 381/107; H04N 5/91

(56) References Cited

U.S. PATENT DOCUMENTS

| | | | |
|---|---|---|---|
| 5,621,840 A | * 4/1997 | Kawamura et al. | 386/95 |
| 5,680,464 A | * 10/1997 | Iwamatsu | 381/107 |
| 5,732,185 A | * 3/1998 | Hirayama et al. | 386/70 |
| 5,844,993 A | * 12/1998 | Iida et al. | 381/107 |
| 5,884,004 A | * 3/1999 | Sato et al. | 386/98 |
| 5,896,358 A | * 4/1999 | Endoh et al. | 369/89 |
| 5,902,115 A | * 5/1999 | Katayama | 434/307 A |

FOREIGN PATENT DOCUMENTS

EP 0521487 A1 * 1/1993 ............ G11B/7/00

* cited by examiner

Primary Examiner—Vincent Boccio
(74) Attorney, Agent, or Firm—Staas & Halsey LLP

(57) ABSTRACT

A digital video playback apparatus selectively reproduces video signals which are recorded by using a plurality of cameras each at different angles and method therefor. A digital playback apparatus reads out first and second video steam data and first and second audio stream data, which are compressed and recorded on a recording medium. A demultiplexer separates a signal output of the digital playback apparatus into system information, the first and second video stream data, and the audio stream data. First and second video decoders expand the first and second compressed video stream data outputs. An audio decoder decodes and expands the audio stream data outputs from the demultiplexer. A key input section generates first and second angle selection signals. A controller analyzes the system information, and generates a switching control signal and a plurality of delay time and gain control signals. A switch selects the first and second video stream data according to the switching control signal. A delay time and gain control circuit delays the audio stream data outputs from the audio decoder according to the delay time control signals, and controls gains of the delayed audio stream data according to the gain control signals.

29 Claims, 6 Drawing Sheets

MULTI-ANGLE DIGITAL AND AUDIO SYNCHRONIZATION RECORDING AND PLAYBACK APPARATUS AND METHOD

BACKGROUND OF THE INVENTION

1. Field of the Invention

The present invention relates to a digital video playback apparatus in a digital video device and method therefor, and more particularly, to a digital video playback apparatus for playing-back the video and audio signals that have been recorded by using a plurality of cameras at different angles and method therefor.

2. Description of the Related Art

As illustrated in FIG. 1, in the case of taking a motion picture or a music video, a camera is set in front of an object and four microphones SL (Surround Left), SR (Surround Right), FL (Front Left), and FR (Front Right) are set surrounding the object to secure the presence of the sounds. The audio and video signals from the camera and the microphones are recorded, on a recording medium such as a disc, by a known video recorder illustrated in FIG. 2.

Referring to FIG. 2, a multiplexer (MUX) 14 receives system information which includes the number of video blocks, the number of audio blocks, a start address for each of the video blocks, and a start address for each of the audio blocks. A video encoder 10 converts an analog video signal input into digital video data, and formats the digital video data in a predetermined manner. The video data output from the video encoder 10 are applied to the multiplexer 14. An audio encoder 12 converts the 4-channel analog audio signals FL, FR, SL and SR from the microphones into digital audio data, and formats the digital audio data in a predetermined manner. The audio data output from the audio encoder 12 is transferred to the multiplexer 14. As illustrated in FIG. 3, the multiplexer 14 generates by turn the system information, the video data, and the audio data. A digital recorder 16 records, by turn, the system information, the video data, and the audio data on the recording medium.

FIG. 4 illustrates a conventional video playback apparatus for playing-back the audio and video data recorded as shown in FIG. 3. As illustrated, a digital playback apparatus 20 reads out video and audio data which are compressed and recorded on the recording medium such as a disc. The read video and audio data undergo an error correction and deinterleaving process. A demultiplexer (DMUX) 22 separates a signal output of the digital playback apparatus 20 into the system information, the video data, and the audio data. A video decoder 24 decodes compressed video stream data output from the demultiplexer 22, to expand the compressed video stream data. The video decoder 24 may be realized by a chip CL480 or CL9100 manufactured by C-Cube Co. An NTSC (National Television System Committee) encoder 26 encodes a video signal output from the video decoder 24 into an NTSC video signal. The NTSC encoder 26 may be realized by a chip CXA1145P manufactured by Sony Co., or a chip KA2194D manufactured by Samsung Electronics Co. An audio decoder 28 decodes the compressed audio stream data output from the demultiplexer 22, to expand the compressed audio stream data into the 4-channel audio data. A digital-to-analog converter and amplifier 29 converts the expanded 4-channel audio data from the audio decoder 28 into the original 4-channel analog audio signals FL, FR, SL and SR, and amplifies the converted 4-channel analog audio signals. However, since such a video playback apparatus reproduces the video signal from only one camera, it is not possible to reproduce a video signal from another camera at a different angle.

SUMMARY OF THE INVENTION

It is therefore an object of the present invention to provide a digital video playback apparatus capable of selectively reproducing video signals which are recorded by using a plurality of cameras each at different angles.

Additional objects and advantages of the invention will be set forth in part in the description which follows and, in part, will be obvious from the description, or may be learned by practice of the invention.

The above and other objects of the present invention are achieved by providing a digital video playback apparatus which includes a digital playback apparatus to read out first and second video steam data and audio stream data, which are compressed and recorded on a recording medium, the first and second video stream data and the audio stream data undergoing an error correction and deinterleaving process; a demultiplexer to separate a signal output of the digital playback apparatus into system information, the first and second video stream data, and the audio stream data; first and second video decoders to expand the first and second compressed video stream data outputs from the demultiplexer, respectively; an audio decoder to decode and expand the audio stream data output from the demultiplexer; a key input section to generate first and second angle selection signals; a controller to analyze the system information from the demultiplexer and the angle selection signals from the key input section, to generate a switching control signal, a plurality of delay time control signals, and a plurality of gain control signals; a switch to select the first and second video stream data outputs from the first and second video decoders according to the switching control signal; and a delay time and gain control circuit to delay the 4-channel audio stream data outputs from the audio decoder according to the delay time control signals, and control gains of the delayed 4-channel audio stream data according to the gain control signals.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENT

A preferred embodiment of the present invention will be described in detail hereinbelow with reference to the attached drawings.

Figure 1:
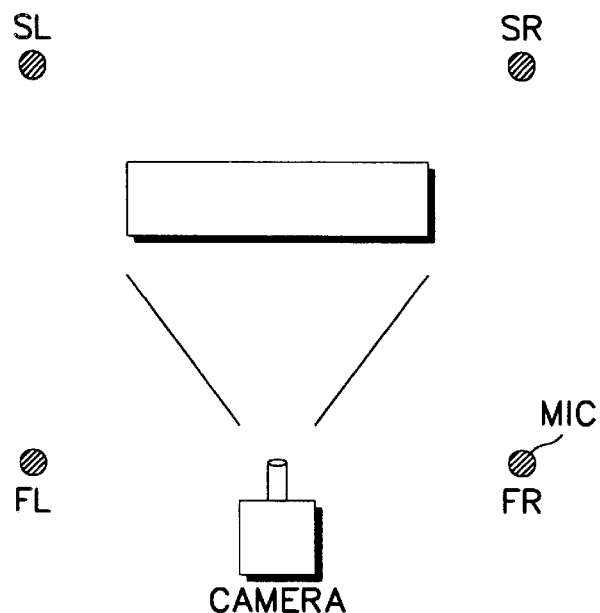
FIG. 1 is a schematic diagram for showing an arrangement of a camera and microphones in a conventional telerecording (video and audio data) system.
Figure 2:
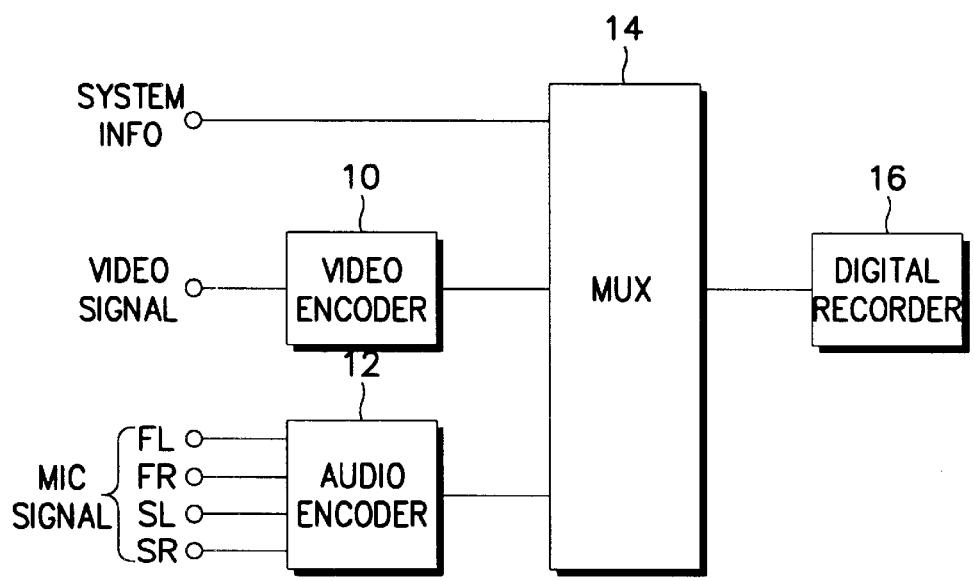
FIG. 2 is a block diagram of a conventional video recording apparatus to record video and audio data in accordance with the system shown in FIG. 1.
Figure 3:
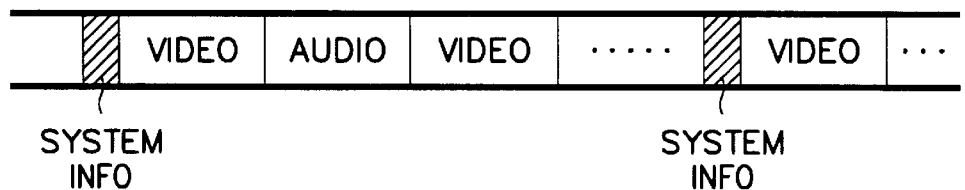
FIG. 3 is a diagram for showing a data stream recorded on a recording medium according to the conventional video recording apparatus shown in FIG. 2.
Figure 4:
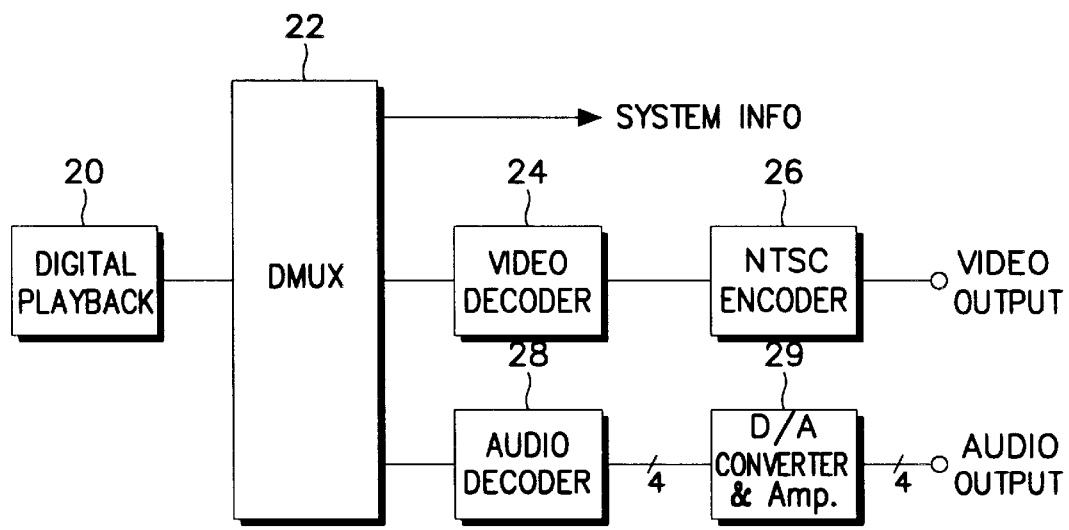
FIG. 4 is a block diagram of a conventional video playback apparatus in accordance with the system shown in FIG. 1.
Figure 5:
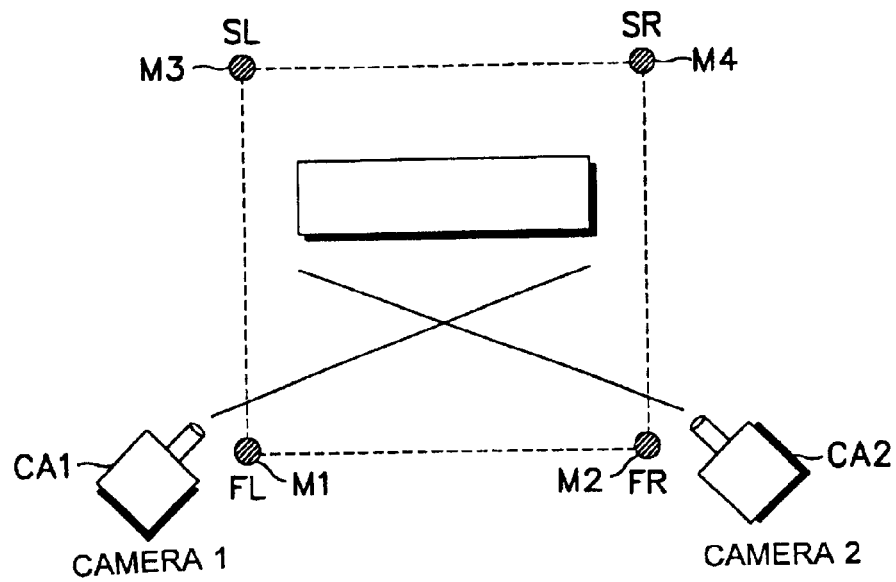
FIG. 5 is a schematic diagram for showing an arrangement of cameras and microphones in a telerecording system according to an embodiment of the present invention.

Referring to FIG. 5, a telerecording system according to an embodiment of the present invention includes at least two cameras CA1 and CA2 at different angles and four microphones M1–M4, in which the microphone M1 is set on the front left side of an object, the microphone M2 is set on the front right side of the object, the microphone M3 is set on the rear left side of the object, and the microphone M4 is set on the rear right side of the object. It should be understood that the number of the cameras may be freely varied at the user's discretion.

Figure 6:
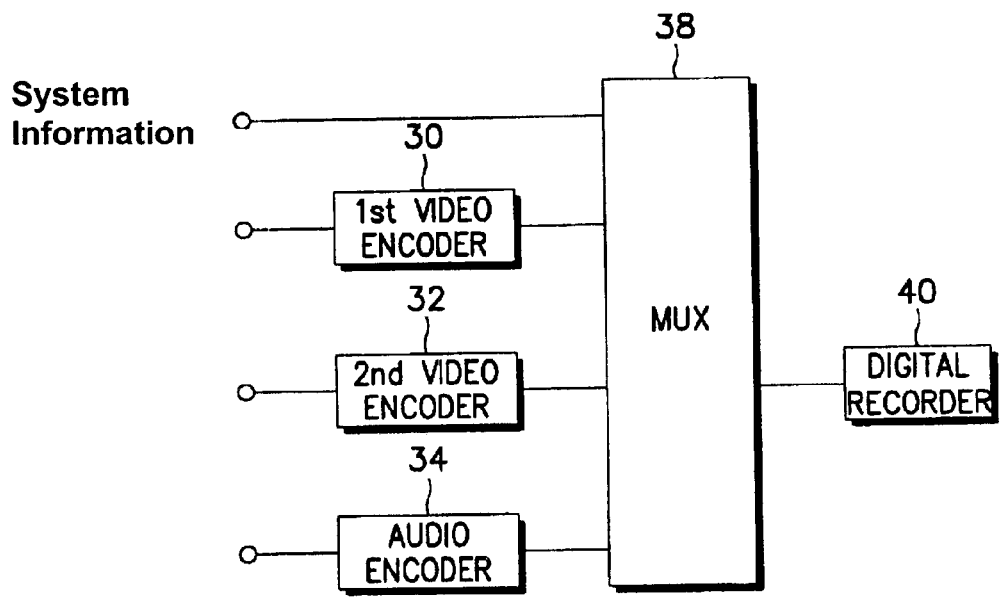
FIG. 6 is a block diagram of a video recording apparatus according to the embodiment of the present invention.

Referring to FIG. 6, a video recording apparatus according to the embodiment of the present invention includes first and second video encoders 30 and 32, an audio encoder 34, a multiplexer 38, and a digital recorder 40.

Figure 7:
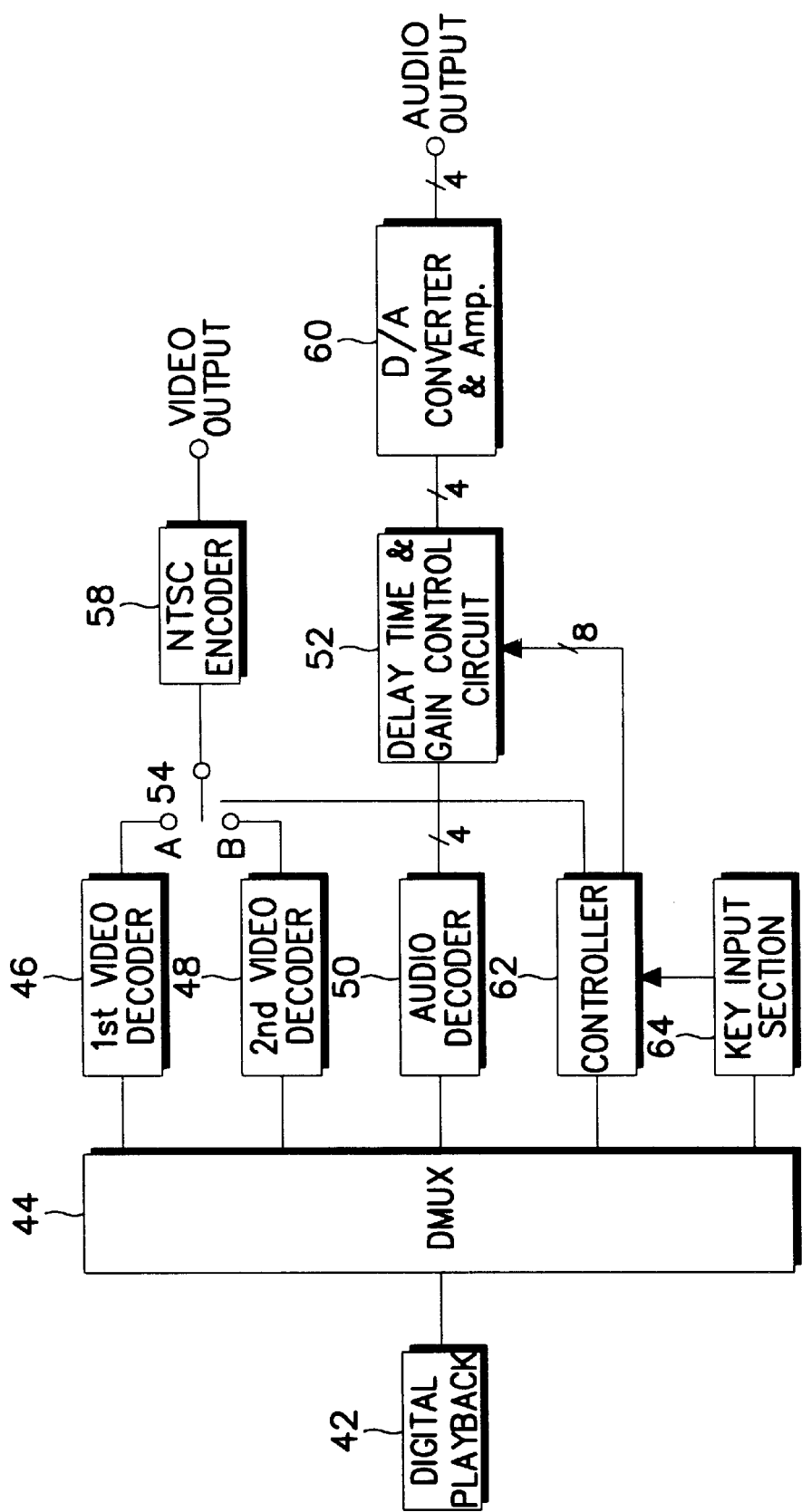
FIG. 7 is a block diagram of a video playback apparatus according to the embodiment of the present invention.

Referring to FIG. 7, a video playback apparatus according to the embodiment of the present invention includes a digital playback apparatus 42 to read out first and second video stream data, and audio stream data, which are compressed and recorded on a recording medium. The read video and audio stream data undergo an error correction and deinterleaving process. A demultiplexer 44 separates a signal output of the digital playback apparatus 42 into the system information, the first and second video stream data, and the audio stream data. First and second video decoders 46 and 48 expand the first and second compressed video stream data from the demultiplexer 44, respectively. The audio decoder 50 decodes and expands the compressed audio stream data from the demultiplexer 44 and outputs expanded 4-channel audio stream data. A key input section 64 includes first and second angle selection keys to generate first and second angle selection signals. A controller 62 analyzes the system information generated from the demultiplexer 44. Further, the controller 62 generates a switching control signal and a plurality of delay time control signals and a plurality of gain control signals according to the first and second angle selection signals generated from the key input section 64. A switch 54 selects one of the first and second video stream data outputs from the first and second video decoders 46 and 48 according to the switching control signal from the controller 62. An NTSC encoder 58 encodes the video data selected by the switch 54 into an NTSC video signal. The NTSC encoder 58 may be realized by a chip CXA1145P manufactured by Sony Co., or a chip KA2194D manufactured by Samsung Electronics Co. A delay time and gain control circuit 52 delays and controls a gain of the decoded 4-channel audio data output from the audio encoder 50. A digital-to-analog converter and amplifier 60 converts the 4-channel audio stream data output from the delay time and gain control circuit 52 into the original 4-channel analog audio signals, and amplifies the 4-channel analog audio signals.

Figure 8:
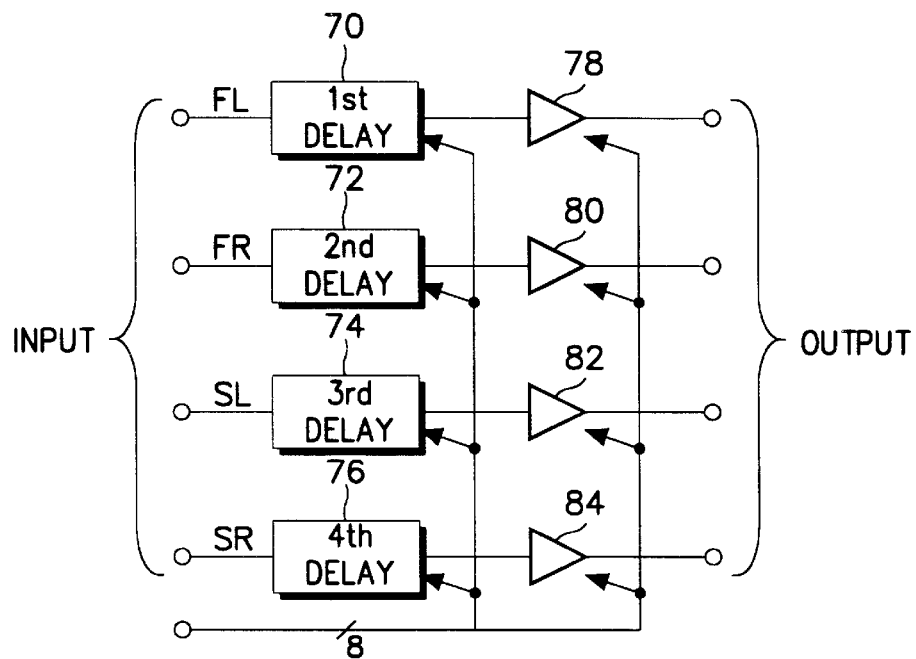
FIG. 8 is a diagram of a delay time and gain control circuit according to the embodiment of the present invention.

Referring to FIG. 8, the delay time and gain control circuit 52 according to the embodiment of the present invention includes first to fourth delays 70, 72, 74 and 76 each having a different delay time, and first to fourth multipliers 78, 80, 82 and 84 each having different gain coefficients. The first to fourth delays 70, 72, 74 and 76 delay the 4-channel audio stream data FL, RF, SL and SR, respectively. The first to fourth multipliers 78, 80, 82 and 84 control gains of the 4-channel audio data FL, RF, SL and SR from the first to fourth delays 70, 72, 74 and 76, according to the gain control signals generated from the controller 62.

Figure 9:
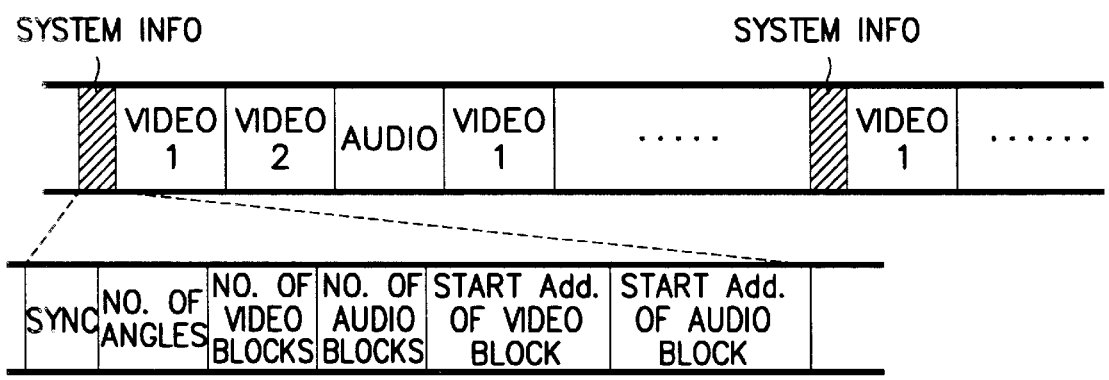
FIG. 9 is a diagram for showing a data stream recorded on a recording medium according to the embodiment of the present invention.

FIG. 9 illustrates the data stream recorded on a recording medium according to the embodiment of the present invention, in which the system information, the first and second video stream data, and the audio stream data are arranged in order. The system information according to the embodiment of the present invention includes synchronization data, the number of angles, the number of video blocks, the number of audio blocks, a start address of each video block, and a start address of each audio block.

Now, referring to FIGS. 5 through 10, a detailed description will be made of the operation of the embodiment of the invention. The multiplexer 38 receives the system information shown in FIG. 9. The first video encoder 30 converts an analog video signal output from the first camera CA1 into digital video data (first video stream data), and formats the digital video data (first video stream data) in a predetermined manner. The second video encoder 32 converts an analog video signal output from the second camera CA2 into the digital video data (second video data), and formats the digital video data (second video stream data) in a predetermined manner. The audio encoder 34 converts the 4-channel audio signals FL, FR, SL, and SR from the microphones M1–M4 into digital audio data (audio stream data), and formats the digital audio data in a predetermined manner. The multiplexer 38 sequentially generates the system information, the first and second video stream data, and the audio steam data, as shown in FIG. 9. The digital recorder 40 sequentially records on the recording medium the system information, the first and second video stream data, and the audio stream data, from the multiplexer 38.

Referring again to FIG. 7, the digital playback apparatus 42 reads out the first and second video stream data and the audio stream data, which are compressed and recorded on the recording medium such as a disc. The read video and audio stream data undergo an error correction and deinterleaving process. The demultiplexer 44 separates a signal output of the digital playback apparatus 42 into the system information, the first and second video stream data, and the audio stream data. The first video decoder 46 expands the first compressed video stream data output from the demultiplexer 44. The second video decoder 48 expands the second compressed video stream data output from the demultiplexer 44. The first and second video decoders 46 and 48 may be realized by a chip CL480 or a chip CL9100 manufactured by C-Cube Co. The audio decoder 50 decodes the compressed audio stream data output from the demultiplexer 44, to expand the compressed audio stream data into the 4-channel audio data.

Figure 10:
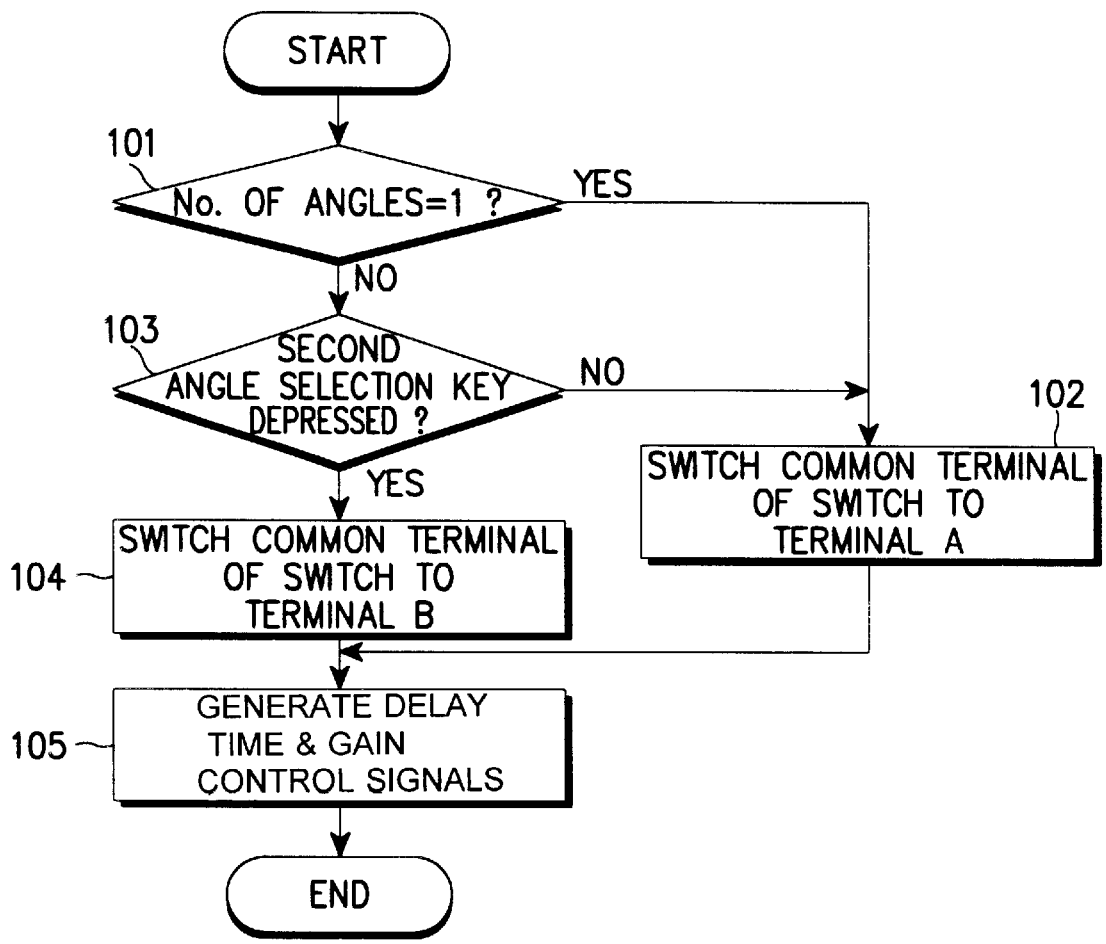
FIG. 10 is a flow chart for selectively reproducing video signals from a plurality of cameras at different angles according to the embodiment of the present invention.

At the moment, if a user depresses the first or second angle selection key prepared on the key input section 64 to generate the first or second angle selection signal, the controller 62 generates the switching control signal to control the switch 54. With reference to FIG. 10, the controller 62 analyzes, at a step 101, the system information to check whether the number of angles is one or not. If the number of the angles is one, the controller 62 generates the switching control signal of a first logic state to switch a common terminal of the switch 54 to a terminal "A" thereof, at a step 102. Then, the first video stream data output from the first video decoder 46 is transferred to the NTSC encoder 58. The NTSC encoder 58 encodes a video signal output from the first video decoder 46 into an NTSC video signal. Further, the 4-channel audio stream data output from the audio decoder 50 is transferred to the delay time and gain control circuit 52. The delay time and gain control circuit 52 delays the 4-channel audio stream data outputs from the audio decoder 50 with different delay times according to associated delay time control signals, and controls the gains of the delayed audio stream data according to associated gain control signals. Then, at a step 105, the controller 62 analyzes video angle information to generate the delay time control signals and the gain control signals to the delay time and gain control circuit 52.

Referring to FIG. 8, in case of reproducing the first video stream data that is recorded by using the first camera CA1, the first delay 70 delays the front left channel audio stream data FL by a predetermined time (for example, 0 ms), according to the associated delay time control signal from the controller 62. The second delay 72 delays the front right channel audio stream data FR by a predetermined time (for example, 5 ms), according to the associated delay time control signal from the controller 62. The third delay 74 delays the rear (or surround) left channel audio stream data SL by a predetermined time (for example, 10 ms), according to the associated delay time control signal from the controller 62. Finally, the fourth delay 76 delays the rear (or surround) right channel audio stream data SR by a predetermined time (for example, 15 ms), according to the associated delay time control signal from the controller 62. Then, the first multiplier 78 multiplies the gain of the front left channel audio stream data FL from the first delay 70 by a gain coefficient '1' according to the associated gain control signal from the controller 62. The second multiplier 80 multiplies the gain of the front right channel audio stream data FR from the second delay 72 by a gain coefficient '0.8' according to the associated gain control signal from the controller 62. The third multiplier 82 multiplies the gain of the rear left channel audio stream data SL from the second delay 74 by a gain coefficient '0.5' according to the associated gain control signal from the controller 62. The fourth multiplier 84 multiplies the gain of the rear right channel audio stream data SR from the second delay 76 by a gain coefficient '0.3' according to the associated gain control signal from the controller 62. The gain controlled 4-channel audio stream data outputs are transferred to the digital-to-analog converter and amplifier 60. The digital-to-analog converter and amplifier 60 converts the 4-channel audio stream data generated from the delay time and gain control circuit 52 into the 4-channel analog audio signals, and amplifies the converted 4-channel analog audio signals.

However, if the number of the angles is not one at the step 101, the controller 62 will check at a step 103 whether or not the user has depressed the second angle selection key of the key input section 64. If the first angle selection key is depressed, the process proceeds to step 102 and this step is performed as set forth above. If the second angle selection key is depressed, the controller 62 generates the switching control signal of a second logic state to switch the common terminal of the switch 54 to a terminal "B" thereof, at a step 104. Then, the second video stream data output from the second video decoder 48 is transferred to the NTSC encoder 58. Thus, the video playback apparatus reproduces the second video stream data that is recorded by using the second camera CA2. Then, the procedure goes to the step 105 to delay and control the gain of the 4-channel audio stream data outputs of the audio decoder 50, in a similar fashion as described above. Namely, the delays 70, 72, 74 and 76 delay the respective channel audio stream data by predetermined amounts which are different from the instance when the first angle selection key is depressed, according to the associated delay time control signals from the controller 62. In this instance, the delay times for the delays 70, 72, 74 and 76 are 5, 0, 15 and 10 ms, respectively. The multipliers 78, 80, 82 and 84 multiply the gains of the respective channel audio stream data according to the associated gain control signal from the controller 62, the gain coefficients being different from the instance that the first angle selection key is depressed. Here, the gain coefficients for the multipliers 78, 80, 82 and 84 are '0.8', '1.0', '0.3' and '0.5', respectively.

Thus, in the present invention, the audio signals can be reproduced differently according to the depression of the first angle selection key or the second angle selection key by the user. That is, the 4-channel audio data based on the first angle selection key depressed by the user and the 4-channel audio data based on the second angle selection key depressed by the user are different from each other by channels.

By delaying and gain controlling the 4-channel audio data, it is possible to differently reproduce the sounds of an object (e.g., actor or musician) respectively input to the microphones M1–M4, according to the cameras situated at different angles. Thus, when a musician is singing a song, moving his location, for example, the sound level of the musician which is input to the microphones M1–M4 is respectively different. To reproduce the sound level input thereto, the delays and gains should be changed accordingly.

As can be appreciated from the foregoing descriptions, the video playback apparatus of the invention can selectively reproduce video signals which are recorded on a recording medium by using a plurality of cameras each at different angles. Thus, the user may selectively watch the videos at different angles together with the associated real sounds.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A digital video playback apparatus to read out first and second video stream data and audio stream data which are compressed and recorded on a recording medium, the digital video playback apparatus comprising:

a digital playback apparatus to read out the compressed first and second video steam data and the compressed audio stream data, from the recording medium and to error-correct and deinterleave the first and second video data and the audio stream data;

a demultiplexer to separate a signal output of said digital playback apparatus into system information, the compressed first and second video stream data recorded from a plurality of different angles, and the compressed audio stream data;

first and second video decoders to expand the first and second compressed video stream data outputs from said demultiplexer, respectively;

an audio decoder to decode and expand said compressed audio stream data output from said demultiplexer into 4-channel audio stream data;

a key input section to generate first and second angle selection signals;

a controller to analyze the system information from the demultiplexer, and to generate a switching control signal indicative of one of the first and second video stream data from said first and second decoders, respectively, a plurality of delay time control signals, and a plurality of gain control signals, in response to one of the first and second angle selection signals selected by a user at said key input section;

a switch to select one of the first and second video stream data from said first and second video decoders, respectively, according to said switching control signal; and a delay time and gain control circuit to delay the 4-channel audio stream data outputs from the audio decoder according to the plurality of delay time control signals, and to control gains of the delayed 4-channel audio stream data according to the plurality of gain control signals.

2. A digital video playback apparatus according to claim 1, wherein said system information comprises a number of the angles, a number of video blocks, a number of audio blocks, a start address of each video block, and a start address of each audio block.

3. A digital video playback apparatus according to claim 2, wherein said delay time and gain control circuit comprises:

first to fourth delays to delay the 4-channel audio stream data outputs of the audio decoder by different delay times, respectively, according to the delay time control signals; and first to fourth multipliers connected respectively to outputs of said first to fourth delays, for controlling gains of the 4-channel audio stream data outputs of the first to fourth delays according to the gain control signals.

4. A digital video playback apparatus to reproduce a digital data stream recorded on a recording medium, wherein the data stream includes video data recorded from a plurality of different angles and audio data, the digital video playback apparatus comprising:

a digital playback device to read out the data stream from the recording medium; and a reproducer to reproduce, from the data stream, the video data of one of the angles and the audio data based upon a selection indicator from a user wherein said reproducer comprises a processing unit to separate the system information, the video data of each of the plurality of different angles from each other, and the audio data, and to decode the video data of each of the plurality of different angles and the audio data, and a selector unit to output the decoded video data of the one of the plurality of different angles and the audio data based upon the selection indicator;

wherein:

the data stream includes system in formation, the video data for each of the plurality of different angles, and the audio data, the video and audio data are compressed as recorded on the recording medium, said processing unit comprises:

a demultiplexer to separate the system information, the video data of each of the plurality of different angles, and the audio data from each other, a plurality of video decoders to expand the compressed video data for each of the plurality of different angles, respectively, and an audio decoder to expand the compressed audio data into multi-channel audio data, and a gain or a delay of the expanded multi-channel audio data is to be set according to stored data corresponding with ones of the plurality of different angles.

5. A digital video playback apparatus as claimed in claim 4, wherein said selector unit comprises:

a key input selector to generate an angle selection signal based upon the selection indicator by the user of the one of the angles;

a controller to generate a switching control signal, a plurality of delay time control signals and a plurality of gain control signals, based upon the angle selection signal;

a switch connected to each of the plurality of decoders, to selectively transmit the decoded video data of the one of the angles based upon the angle selection signal; and a delay time and gain control circuit connected to the audio decoder, to delay the multi-channel audio data from the audio decoder according to the plurality of delay time control signals, and to control gains of the delayed multi-channel audio data according to the plurality of gain control signals.

6. A digital video playback apparatus as claimed in claim 4, wherein:

said demultiplexer outputs an angle number signal indicative of a number of the angles of the video data from the system information; and said selector unit includes a key input selector to generate an angle selection signal based upon the selection indicator by the user of the one of the angles, a controller to generate a switching control signal, a plurality of delay time control signals and a plurality of gain control signals, based upon the angle number signal and the angle selection signal, a switch connected to each of the plurality of video decoders, to selectively transmit the decoded video data of the one of the angles based upon the switching control signal, and a delay time and gain control circuit connected to the audio decoder, to delay the multi-channel audio data from the audio decoder using corresponding sets of parameters according to the plurality of delay time control signals, and to control gains of the delayed multi-channel audio data according to the plurality of gain control signals;

said controller generating the switching control signal to automatically cause the switch to be in a given state to transmit the video data of a particular angle and delays and gain controls the multi-channel audio data according to a first one of the sets of parameters, if the angle number signal indicates the number of angles to be one, and otherwise generates the switching control signal to cause the switch to transmit the video data of the one angle and to delay and gain control the multi-channel audio data using the corresponding set of parameters, based upon the angle selection signal.

7. A digital video playback apparatus as claimed in claim 4, wherein the data stream recorded on the recording medium includes the system information, the video data for each of the plurality of different angles and the audio data for each of the plurality of different angles in that order, and said digital playback device reads out the data stream from the recording medium in that order.

8. A digital video playback apparatus as claimed in claim 4, wherein the multi-channel audio data expanded by the audio decoder is 4-channel audio data.

9. A digital video playback apparatus to reproduce a digital data stream recorded on a recording medium, wherein the data stream includes video data recorded from a plurality of different angles and audio data, the digital video playback apparatus comprising:
 a digital playback device to read out the data stream from the recording medium; and
 a reproducer to reproduce, from the data stream, the video data of one of the angles and the audio data based upon a selection indicator from a user, wherein said reproducer comprises
  a processing unit to separate the system information, the video data of each of the plurality of different angles from each other, and the audio data, and to decode the video data of each of the plurality of different angles and the audio data, and
  a selector unit to output the decoded video data of the one of the plurality of different angles and the audio data based upon the selection indicator;
 wherein the data stream includes system information, the video data for each of the plurality of different angles, and the audio data, and
 wherein said selector unit comprises:
  a key input selector to generate an angle selection signal based upon the selection indicator by the user of the one of the angles;
  a controller to generate a switching control signal, a delay time control signal and a gain control signal, based upon the angle selection signal;
  a switch to selectively transmit the decoded video data of the one of the angles based upon the angle selection signal; and
  a delay time and gain control circuit to delay the audio data from the audio decoder using a corresponding one of a first set of parameters according to the delay time control signal, and to control a gain of the delayed audio stream data using a corresponding one of a second set of parameters according to the gain control signal.

10. A digital video playback apparatus as claimed in claim 9, wherein the data stream recorded on the recording medium includes the system information, the video data for each of the plurality of different angles and the audio data for each of the plurality of different angles in that order, and said digital playback device reads out the data stream from the recording medium in that order.

11. A digital video recording apparatus to record a digital data stream of video data from a plurality of different angles on a recording medium and audio data, the digital video recording apparatus comprising:
 a data stream generator to generate the data stream from the video data received from the plurality of different angles and the audio data, wherein said data stream generator comprises
  a plurality of video encoders and an audio encoder, wherein each of the plurality of video encoders receives and encodes the video data of a respective one of the plurality of different angles, and the audio encoder receives and encodes the audio data, and
  a multiplexer to combine the video and audio data of the different angles from each of the video encoders and the audio encoder, data that corresponds with ones of the plurality of different angles and sets a delay or a gain for the audio data, along with system information of the video and audio data, to generate the data stream; and
 a digital recording device to record the data stream on the recording medium.

12. A digital video playback apparatus as claimed in claim 11, wherein said multiplexer arranges the data stream in the order of the system information, the video data for each of the plurality of different angles and the audio data for each of the plurality of different angles.

13. A digital video playback apparatus as claimed in claim 11, wherein the audio encoder changes the audio data from 4-channel audio data to a single audio data stream.

14. A method of reproducing a digital data stream recorded on a recording medium, wherein the data stream includes system information, video data recorded from a plurality of different angles and audio data, comprising the steps of:
 reading the data stream from the recording medium;
 separating the system information, the video data for each of the plurality of different angles, and the audio data from each other; and
 selecting the system information and the video data for one of the plurality of different angles, and delaying and controlling a gain of the audio data based upon said selecting the system information and the video data.

15. A method of reproducing a digital data stream recorded on a recording medium, wherein the data stream includes system information, video data recorded from a plurality of different angles and audio data, comprising the steps of:
 reading the data stream from the recording medium;
 separating the system information, the video data for each of the plurality of different angles, and the audio data from each other; and
 selecting the system information and the video data for one of the plurality of different angles, and delaying and controlling a gain of the audio data,
 wherein said step of selecting the system information comprises:
  determining a number of the angles from the separated system information; and
  automatically selecting the video data for one angle, and delaying and controlling the gain of the audio data using a first one of sets of parameters if the number of angles is one, and otherwise selecting the data for the one of the plurality of different angles and delaying and controlling the gain of the audio data using corresponding ones of the sets of parameters based upon an input from a user.

16. A method as claimed in claim 15, further comprising the step of:
 decoding the video data for each of the different angles and the audio data;
 wherein the step of automatically selecting the video data further comprises the step of controlling a switch to selectively enable transmission of the video data for the one angle or the one of the plurality of different angles, and controlling a delay and gain control unit to adjust the delay and the gain of the audio data.

17. A method as claimed in claim 15, further comprising the steps of:
 decoding the video data for each of the different angles and the audio data; and
 decoding the audio data, to generate multi-channel audio data;

wherein the step of automatically selecting the video data further comprises the step of controlling a switch to selectively enable transmission of the video data for the one angle or the one of the plurality of different angles, and controlling a delay and gain control unit to adjust the delays and the gains of each channel of the audio data.

18. A method as claimed in claim 17, wherein the step of automatically selecting the video data further comprises the steps of:
   transmitting each channel of the multi-channel audio data through a corresponding delay and adjusting a delay time thereof based upon the one angle or the one of the plurality of different angles; and
   transmitting each delayed channel of the audio data through a corresponding gain control unit and adjusting a gain thereof based upon the one angle or the one of the plurality of different angles.

19. A method as claimed in claim 17, wherein said delay time and gain control circuit comprises:
   a plurality of delays to respectively delay the channels of the multi-channel audio data according to the plurality of delay time control signals, respectively; and
   a plurality of multipliers to control gains of the plurality of delayed channels of the multi-channel audio data according to the plurality of control gain control signals, respectively.

20. A method as claimed in claim 19, wherein each of the plurality of delays delays the respective channels of the multi-channel audio delay times by different delay times and each of the plurality of multipliers multiplies the respective delayed of the multi-channel audio data by different gain coefficients.

21. A method as claimed in claim 15, wherein said delay time and gain control circuit comprises:
   a plurality of delays to respectively delay the channels of the multi-channel audio data according to the plurality of delay time control signals, respectively; and
   a plurality of multipliers to control gains of the plurality of delayed channels of the multi-channel audio data according to the plurality of control gain control signals, respectively.

22. A method as claimed in claim 21, wherein each of the plurality of delays delays the respective channels of the multi-channel audio delay times by different delay times and each of the plurality of multipliers multiplies the respective delayed of the multi-channel audio data by different gain coefficients.

23. A digital video playback apparatus to reproduce a digital data stream recorded on a recording medium, wherein the data stream includes video data recorded from a plurality of different angles and audio data, the digital video playback apparatus comprising:
   a digital playback device to read out the data stream from the recording medium; and
   a reproducer to reproduce, from the data stream, the video data of one of the angles according to a selection from a user, and the audio data by delaying and gain controlling the audio data according to the selection from the user.

24. A digital video playback apparatus to reproduce a digital data stream recorded on a recording medium, wherein the data stream includes video data recorded from a plurality of different angles and audio data, the digital video playback apparatus comprising:
   a digital playback device to read out the data stream from the recording medium; and
   a reproducer to reproduce, from the data stream, the video data of one of the angles according to a selection indicator from a user, and the audio data by delaying and gain controlling the audio data according to the selection indicator from the user, wherein said reproducer comprises:
      a plurality of video decoders to expand the video data for each of the plurality of different angles, respectively; and
      an audio decoder to expand the audio data into multi-channel audio data;
      a key input selector to generate an angle selection signal based upon the selection indicator by the user of the one of the angles;
      a controller to generate a switching control signal, a plurality of delay time control signals and a plurality of gain control signals, based upon the angle selection signal;
      a switch connected to each of the plurality of decoders, to selectively transmit the decoded video data of the one of the angles based upon the angle selection signal; and
      a plurality of delays to respectively delay the channels of the multi-channel audio data according to the plurality of delay time control signals, respectively; and
      a plurality of multipliers to control gains of the plurality of delayed channels of the multi-channel audio data according to the plurality of control gain control signals, respectively.

25. A digital video playback apparatus to reproduce a digital data stream recorded on a recording medium, wherein the data stream includes video data recorded from a plurality of different angles and audio data, the digital video playback apparatus comprising:
   a digital playback device to read out the data stream from the recording medium; and
   a reproducer to reproduce, from the data stream, the video data of one of the angles and the audio data based upon a selection, said reproducer comprising
      a processing unit to separate the system information, the video data of each of the different angles from each other, and the audio data, to decode the video data of each of the plurality of different angles and the audio data, and to reproduce the audio data with a gain or a delay set in accordance with stored data corresponding to ones of the plurality of angles, and
      a selector unit to output the decoded video data of the one of the plurality of different angles and the audio data based upon the selection.

26. A digital video playback apparatus to reproduce a digital data stream recorded on a recording medium, wherein the data stream includes video data recorded from a plurality of different angles and audio data, the digital video playback apparatus comprising:
   a digital playback device to read out the data stream from the recording medium; and
   a reproducer to reproduce, from the data stream, the video data of one of the angles and the audio data based upon a selection indicator from a user,
   wherein the audio data is reproduced with a delay or a gain set according to stored data corresponding to ones of the plurality of different angles.

27. A digital video playback apparatus as claimed in claim 26, wherein:
   the data stream includes system information, the video data for each of the plurality of different angles and the audio data;

said digital playback device error correcting and deinterleaving the data stream; and said reproducer reproducing the video data of one of the angles based upon the selection indicator and the system information, and the audio data based upon the selection indicator.

28. A digital video playback apparatus as claimed in claim 26, wherein:

the data stream includes system information, the video data for each of the plurality of different angles, and the audio data; and said reproducer includes
 a processing unit to separate the system information, the video data of each of the plurality of different angles from each other, and the audio data, and to decode the video data of each of the plurality of different angles and the audio data, and
 a selector unit to output the decoded video data of the one of the plurality of different angles and the audio data based upon the selection indicator.

29. A digital video recording apparatus to record a digital data stream of video data from a plurality of different angles on a recording medium and audio data, the digital video recording apparatus comprising:

a data stream generator to generate the data stream from the video data received from the plurality of different angles, the audio data, and data that corresponds with ones of the plurality of different angles and sets a delay or a gain for the audio data; and a digital recording device to record the data stream on the recording medium.

* * * * *